June 28, 1966 H. J. ZEIGER ETAL 3,258,718
SEMICONDUCTOR INFRARED MASER
Filed Feb. 7, 1963 2 Sheets-Sheet 1
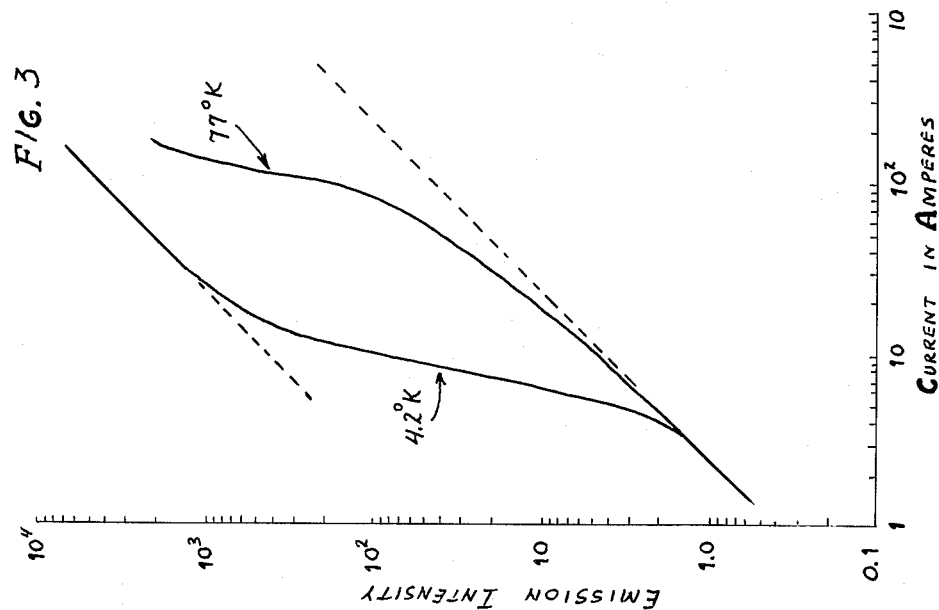
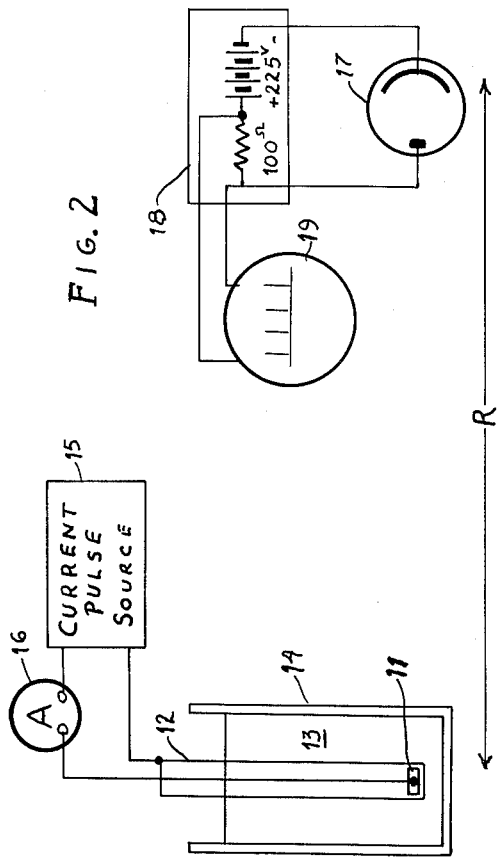
INVENTORS
HERBERT J. ZEIGER
WILLIAM E. KRAG
ROBERT J. KEYES
BENJAMIN LAX
ALAN L. McWHORTER
THEODORE M. QUIST
ROBERT H. REDIKER
BY Edward D. Thomas
AGENT June 28, 1966   H. J. ZEIGER ETAL   3,258,718
SEMICONDUCTOR INFRARED MASER
Filed Feb. 7, 1963   2 Sheets-Sheet 2
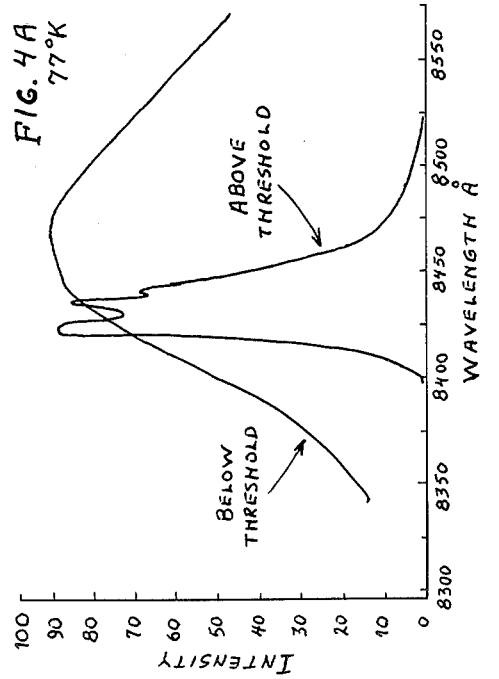
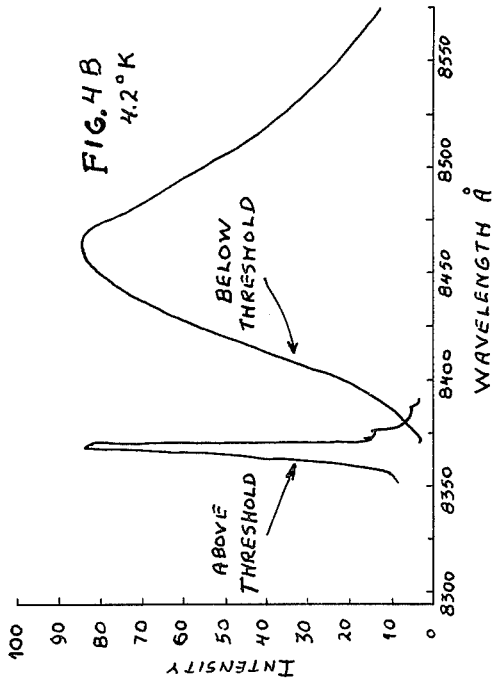
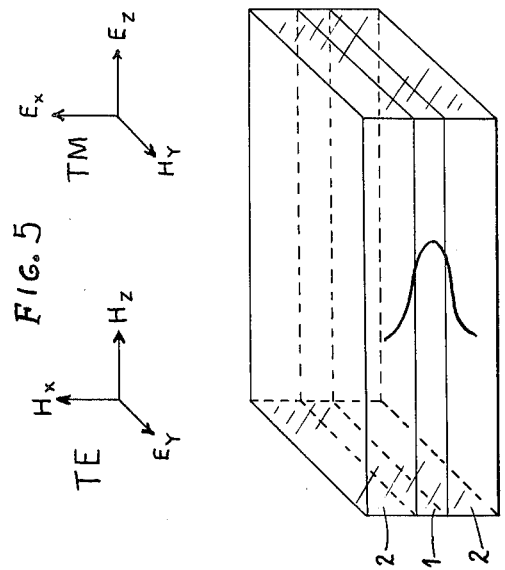
INVENTORS
HERBERT J. ZEIGER
WILLIAM E. KRAG
ROBERT J. KEYES
BENJAMIN LAX
ALAN L. McWHORTER
THEODORE M. QUIST
ROBERT H. REDIKER
BY Edward D. Thomas
AGENT 3,258,718
SEMICONDUCTOR INFRARED MASER
Herbert J. Zeiger, Newton, Robert J. Keyes, Waltham, William E. Krag, Lexington, Benjamin Lax, Newton, Alan L. McWhorter, Cambridge, Theodore M. Quist, West Acton, and Robert H. Rediker, Newton, Mass. assignors to Massachusetts Institute of Technology, Cambridge, Mass., a corporation of Massachusetts
Filed Feb. 7, 1963, Ser. No. 257,025
1 Claim. (Cl. 331—94.5)

The present invention relates to the use of semiconductor solid state materials for obtaining maser action and more particluarly to the use of transitions in a doped semiconductor to yield radiation at a wavelength in the infrared region.

The possibility of achieving maser operation in semiconductors has been considered theoretically for several years. It has long been recognized that atomic and molecular systems provide any number of natural resonators tuned to almost any desired frequency in the infrared and optical region and that many ways are known to excite these resonators. It remained for the maser principle to show how to make individual resonators emit in phase or with a fixed relative phase. For a comprehensive survey of the state of the art, reference may be made to "Quantum Electronics," edited by C. H. Townes and published by Columbia University Press, 1960, with particular reference to the chapters: "Optical Pumping and Related Effects," by J. Brossel starting on page 81; "Cyclotron Resonances and Impurity Levels," by B. Lax starting on page 444, and "Infrared and Optical Masers," by A. L. Schawlow starting on page 553.

Briefly, considerable experimental evidence has been obtained to show that in semiconductors, in addition to the usual energy band states, discrete or quantized levels can be achieved not only by a magnetic field but also by doping with impurities or other imperfections.

Further, it appears possible to achieve population inversion among some of these states.

The normal microwave maser has an unstable ensemble of atomic or molecular systems introduced into a cavity which would normally have at least one resonant mode near the frequency which corresponds to radiative transitions of these systems. The extension of microwave maser techniques to the infrared and optical region was considered theoretically by A. L. Schawlow and C. H. Townes in a paper "Infrared and Optical Masers," Physical Review, 112, 1940, (1958). Therein it was demonstrated that maser oscillations are possible when a resonant cavity much larger than a single wavelength and having many resonant modes is used. A single mode is selected by making only the end walls of the cavity reflecting and defining a small angular aperture. The use of two parallel plates for an ammonia gas maser operating in the infrared region is disclosed in U.S. Patent No. 2,851,652, entitled, "Molecular Amplification and Generation Systems and Methods," issued September 9, 1958, to Robert H. Dicke.

Assuming that the active material is in the form of a solid having polished and reflecting ends, and that the material has a negative temperature population between two energy levels corresponding to some frequency for which the solid form has a resonant mode, then radiation emitted by an atom in a direction approximately parallel to an axis perpendicular to the polished ends will remain in the cavity because of reflections by the cavity walls. In propagating through the material this radiation stimulates emission from other excited atoms. The stimulated emission is identical in phase and propagation direction with the radiation which triggered the emission. As the number of excited atoms is increased, the threshold of maser oscillation will be reached first for a wave whose direction is very close to the axis. Then the output will be a wave which is not only very monochromatic and coherent but is nearly all propagated in a single direction. The output will occur in one or more of the many modes which could be supported by a cavity resonator of comparable dimensions. Meanwhile, light traveling in other directions will leave the system before making many passes and will not react strongly with the active medium.

When semiconductors are considered for use as the active material for a solid state infrared maser, it is possible to distinguish between three classes of transitions: (1) Transitions between states associated with the same band minimum, which need not involve phonons. (2) Transitions between states associated with two different band minima, both at the same $\vec{k}$ value, which need not involve phonons. (3) Transitions between states associated with two different band minima, located at different points in $\vec{k}$ space; these involve the emission or absorption of phonons. The states may be band states, or they may be impurity levels associated with a given band. Population inversion in the three classes may be achieved by any one of several means such as injection into a higher energy state across a semiconductor junction; optical excitation of carriers to higher energy states; excitation of carriers to higher energy states by bombardment with electrons or other ionizing radiation. Examples of the first class are recombination processes from a band to an impurity level associated with that band and between two impurity levels associated with the band. An example of the second class is a transition between a donor impurity and an acceptor impurity in a compensated semiconductor material where both band minima are at the same $\vec{k}=\vec{k}_0$, such as apparently occurs in gallium arsenide p-n junctions. A transition of the third class may be of the same type as the example for the second class except that the respective band minima are not at the same point in $\vec{k}$ space. In a semiconductor material such as germanium and silicon transitions between a donor and an acceptor impurity are of this third class.

There is then a sound theoretical background on which to expect to obtain infrared and optical maser operation in semiconductors. The problem has been to find a suitable semiconductor and the proper structure and operating conditions. The principal object of the present invention is to show how to achieve maser operation in semiconductors by a process in which electrical energy is converted to a beam of monochromatic coherent radiation with extremely high efficiency.

In the first place, the selected semiconductor is required to have a set of energy levels with transition frequencies lying in the infrared and optical region, and having relative lifetimes for the respective states, such that a negative temperature population can be supported. Second, the selected semiconductor must have the property of converting electrical energy into a narrow range of photon energy at high quantum efficiency.

As the present invention shows, the required properties are found to be present in the recently developed gallium arsenide diffused diode. As disclosed by R. J. Keyes and T. M. Quist in their paper, "Recombination Radiation Emitted by Gallium Arenside," published in Proceedings of the IRE, vol. 50, 1822, 1962, gallium arsenide diffused diodes emit radiation which is concentrated in a relatively narrow frequency band and at 77° K. the diodes are found to approach 85 percent efficiency in the conversion of injected holes into photons of approximately the gap energy. This high quantum efficiency of conversion of electrical energy into photon energy in the GaAs diode indicates that there are no significant competing non-radiative transitions within the semiconductor material. The concentration of the radiation emitted by the gallium arsenide diode into a narrow band indicates that it is likely that maser operation can be achieved in this material. Consequently, the present invention contemplates achieving maser operation in gallium arsenide diffused diodes biased for forward current flow at a current level sufficient to obtain a population inversion within a region large enough so that coherent emission is stimulated.

However, it is to be understood that, while the required population inversion may be advantageously achieved by current injection across the junction of a forward biased diode, the use of other well known techniques for achieving population inversion, as by optical pumping, is also contemplated.

The above and other objects and features of this invention will be more fully appreciated from the following detailed description when read in conjunction with the accompanying drawings in which:

FIGURE 1 illustrates the structure of a suitable diode;

FIGURE 2 is a sketch of the arrangement used to measure the radiation emitted by the diode of FIGURE 1;

FIGURE 3 is a plot of the radiation emitted by the diode as a function of diode current at 77° K. and 4.2° K.;

FIGURE 4A and FIGURE 4B are plots of the emission spectra below and above threshold at 77° K. and 4.2° K., respectively;

FIGURE 5 is a simplified model of the diode which is used to explain maser action.

Diodes suitable for semiconductor maser use can be fabricated from single-crystal n-type gallium arsenide which has a room temperature net impurity concentration and electron mobility of $6 \times 10^{16}$ impurities cm.$^{-3}$ and $4.1 \times 10^3$ cm.$^2$/volt sec. respectively. A p-type layer is formed on the surface of wafer 5 by diffusing zinc from a dilute solution of zinc in gallium in a sealed evacuated quartz tube at 680° C. for 18 hours. This produces a p-type layer of the order of 5 microns after lapping. The semiconductor wafer is lapped to a uniform thickness of 0.003 inch and diced. FIGURE 1, which is not to scale, shows a diode having a junction area of 1.4 mm.×0.6 mm. The short sides are polished as shown by the shading on the end 9, to be optically flat and nearly parallel. The n-type region 6 is alloyed to a gold-tin plated molybdenum bar 12 to form the ohmic base contact after which a 0.010 inch Pb–Zn sphere 8 is alloyed to the p-type layer 7 to form the other ohmic contact.

FIGURE 2 shows the arrangement for measuring the radiation emitted by the diode when it is biased for forward current flow. The GaAs diode 11 is mounted at one end of the bar 12 by which the diode is immersed in the liquid contents 13 (nitrogen for 77° K., helium for 4.2° K.) of the Dewar flask 14. Current is supplied to the diode 11 from the source 15, which may be any conventional pulse source capable of furnishing pulse currents up to 190 amperes of several microseconds' duration.

A calibrated type 925 phototube 17 is placed a measured distance R from the diode 11. The phototube is energized by the power supply 18 and the phototube current is measured by the oscilloscope 19. For a given current flow from the source 15, as measured by the meter 16, the corresponding phototube current can be plotted as representing the diode emission intensity.

FIGURE 3 is a plot of the light emission from the polished end surface of the diode 11 as a function of diode current, obtained by the arrangement of FIGURE 2. At 77° K. the radiation is emitted in the manner described in the paper by Keyes and Quist, cited above, until the diode current reaches a threshold value of about 90 amperes, a current density of approximately $10^4$ a./cm.$^2$. Above the threshold value the light radiated from the polished end increased drastically, as shown in FIGURE 3. At 4.2° K., the threshold is lowered by a factor of 15 to approximately 6 amperes, or a current density of about 700 a./cm.$^2$. Far above the threshold value, in the vicinity of 20 amperes, the light output again becomes linear with current.

At 4.2° K., in the linear region of FIGURE 3, well above threshold, the data indicate that the maser is operating at nearly unit quantum efficiency, i.e., that for every electron crossing the junction nearly one photon is emitted. On the basis of unity quantum efficiency, at the current input of 190 amperes, the peak radiated power of the diode is of the order of 280 watts.

FIGURES 4A and 4B show the narrowing of the infrared emission at 77° K. and 4.2° K., respectively, above and below the threshold current. Below threshold the curve is plotted from data taken with continuous current flow through the gallium arsenide diode while the data above threshold were obtained with 5 microsecond pulses at a 13 c.p.s. repetition rate. Since the emission intensities below and above threshold are obtained under different experimental conditions, the plotted intensities are not to the same intensity scale and are not directly comparable. At 77° K., the spectrum above threshold shows multiple peaks of approximately 10 A. separation and the bandwidth of the emitted radiation is narrowed from 175 A. below threshold to about 30 A. above threshold. At 4.2° K. the emitted line width above threshold narrows still further to less than 5 A. It is also observed that emission peak shifts at 4.2° K. to a shorter wavelength than that found at 77° K. At high current levels at both 77° K. and 4.2 K. the line also broadens and shows structure, which may be presumed to be due to the excitation of additional modes.

This striking narrowing of the spectrum is strong evidence of coherence and maser action. Investigation showed that below threshold the diode behaved as a nearly spherical radiator but above threshold a very intense and narrow beam radiates from the junction region in the horizontal plane of the junction with a vertical half-power beamwidth of less than 10°.

It is to be noted that maser action is demonstrated over a wide temperature range. At 77° K. the current density threshold necessary for maser operation is considerably higher than the threshold current density at 4.2° K. The minimum pumping current to achieve the necessary population inversion is affected by temperature. The levels which are involved in the maser process may be depopulated by thermal agitation as the temperature increases and this could lead to an increase in the threshold current with temperature. Consequently, for the gallium arsenide diode to function as a maser, the available pumping power must meet the threshold current density requirement to achieve population inversion for a particular temperature. The Keyes and Quist paper, cited above, shows that the gallium arsenide diode is capable of substantial infrared radiation at room temperature and this indicates that the experimental 77° K. should not be considered the upper temperature limit for maser operation. However, it is also apparent that 4.2° K. is not necessarily a lower temperature limit and that the diode may be expected to be a more efficient infrared maser in terms of reduced threshold current density if temperatures below 4.2° K. are obtained.

The observed data indicate that the emitted radiation does not involve direct band-to-band transitions. This concept is consistent with the energy of the emitted photons, which is less than that of the gap at the temperature of operation, and is further supported by the absence of an observable shift of the spontaneous emission line in the presence of a magnetic field as strong as 90 kilogauss.

The maser action appears to occur in even TE or TM modes guided along the plane of the junction in a manner similar to that of surface modes on a dielectric slab. For a simplified model to explain the action, reference is made to FIGURE 5, wherein the region of inverted population at the junction is labeled 1 and lossy dielectric regions on either side are labeled 2. The end areas are shaded to indicate the polished reflecting surfaces. The field components of TE and TM modes are indicated for the case where propagation is along the Z axis. The $x$-dependence of symmetrical electromagnetic fields is shown.

Regions 2 are characterized by a lossy dielectric constant $\epsilon_2 = \epsilon_2' + \sigma_2/\omega$, and the region of inverted population of thickness $2w$ by a dielectric constant with negative conductivity $\epsilon_1 = \epsilon_1' - \sigma_1/j\omega$. Assuming a variation of the fields in $y$, $z$ and $t$ of the form $e^{j\omega t - y y - jk_z z}$, and an $x$-variation of the form $\cos k_1 x$ or $\sin k_1 x$ in region 1 and $e^{-jk_2 x}$ in region 2, the boundary conditions at the interface require that $$k_1 \tan k_1 w = jk_2 \quad \text{(TE mode)} \quad (1)$$

$$\frac{k_1}{\epsilon_1} \tan k_1 w = \frac{jk_2}{\epsilon_2} \quad \text{(TM mode)}$$

From Maxwell's equations, $k^2 + k_1^2 = \omega^2 \mu_0 \epsilon_1$ and $$k^2 + k_2^2 = \omega^2 \mu_0 \epsilon_2$$

where $k^2 = k_y^2 + k_z^2$.

Assuming $k_1 z \ll 1$, the solutions for $k$ are $$k^2 = k_0^2 \left[ \frac{\epsilon_2}{\epsilon} + (k_0 w)^2 \frac{(\epsilon_1 - \epsilon_2)^2}{\epsilon} - \frac{4}{3}(k_0 w)^4 \frac{(\epsilon_1 - \epsilon_2)^3}{\epsilon} + \ldots \right]$$
(TE)(2)

$$k^2 = k_0^2 \left[ \frac{\epsilon_2}{\epsilon} + (k_0 w)^2 \frac{(\epsilon_1 - \epsilon_2)^2}{\epsilon} (\epsilon_2/\epsilon_1)^2 + \ldots \right]$$
(TM)

where $k_0 = w\sqrt{\mu_0 \epsilon}$

Assuming $$\sigma_2 \ll \sigma_1 \ll \omega\epsilon, \quad k \simeq k_0 \left(1 + j\frac{\eta}{2}\right)$$

where $$\eta = \frac{-\sigma_2}{\omega\epsilon} + 2(k_0 w)^2 \frac{(\epsilon_1' - \epsilon)}{\epsilon} \frac{\sigma_1}{\omega\epsilon} + \frac{4}{3}(k_0 w)^4 \left[ \frac{(\sigma_1)^3}{\omega\epsilon} = 3\frac{(\epsilon_1' - \epsilon)^2}{\epsilon} \frac{\sigma_1}{\omega\epsilon} \right]$$
(TE)(3)

$$\eta \simeq \frac{-\sigma_2}{\omega\epsilon} + 2(k_0 w)^2 \frac{(\epsilon_1' - \epsilon)}{\epsilon} \frac{\sigma_1}{\omega\epsilon} + \left[ 2(k_0 w)^2 = \frac{4}{3}(k_0 w)^4 \right] \left[ \frac{(\sigma_1)^3}{\omega\epsilon} - 3\frac{(\epsilon_1' - \epsilon)^2}{\epsilon} \frac{\sigma_1}{\omega\epsilon} \right]$$
(TM)

In the unbounded medium, with the parameter values appropriate for the present maser diode, both TE and TM modes appear to have almost the same threshold for growth.

If $\eta$ is sufficiently positive to overcome losses at the transverse boundaries, then coherent oscillation will occur. The decay normal to the plane of the junction is so rapid that the boundaries in the $x$-direction should play no role. Of the many nearly degenerate modes with different values for the real parts of $k_y$ and $k_z$, that mode which has the lowest boundary loss should be the one in which the maser operation first occurs. The multipeaks at helium temperature, which are separated by approximately 5 A., may be due to neighboring $k_y$ or $k_z$ modes with slightly higher thresholds.

Assuming a weak dependence of the radiative matrix elements on the photon modes, then at any frequency and position, regardless of the electronic levels involved, one can directly relate the stimulated emission just above threshold to the spontaneous emission just below threshold. Since a quantum efficiency of less than unity and the presence of stimulated absorption will only decrease the negative conductivity that can be produced at a given current density J, one can establish an upper limit for $\sigma_1(\omega, x)$ at threshold by taking the quantum efficiency to be unity and dropping the stimulated emission term. This gives $$\sigma_1(\omega, x) < \pi^2 \frac{\omega J}{ek_0^3} h(\omega, x) \quad (4)$$

where $k_0^2 = \omega^2 \mu_0 \epsilon$ and $h(\omega, x)$, normalized such that $\iint d\omega \, dx \, h(\omega, x) = 1$, is the frequency and spatial distribution of the spontaneous emission just below threshold. In the simplified model of FIGURE 5 that we have been using, we approximate $h(\omega, x)$ by $g(\omega)/2w(\omega)$, where $g(\omega)$ is the normalized spontaneous emission line shape, which can be determined experimentally.

The value of $\sigma_2$ can be determined from the measured absorption coefficients, which were about 500 cm.$^{-1}$ on the p-side and 10 cm.$^{-1}$ on the n-side, essentially independent of temperature. Computing the reflection coefficient from the dielectric mismatch (the boundary loss is almost negligible in comparison with that due to $\sigma_2$), we find from (3) that we must have $\sigma_1 \simeq 100$ ohm$^{-1}$ cm.$^{-1}$ for maser action to occur. At 77° K. this is about a factor of 3 less than the upper limit set by (4) for the observed threshold current density of $10^4$ a./cm.$^2$, which seems quite reasonable.

Selection of the two opposed surfaces to be polished reflectors determines the direction of propagation of the coherent radiation. By implication, the remaining surfaces are expected to be rougher and poor reflectors for efficient mode selection. The reflectivity of the polished surfaces can be improved by applying reflective coatings such as thin metallic films which have partial reflection and partial transmission properties at the wavelength of the coherent radiation. These concepts lead to a modification of the diode structure which can be explained with the aid of FIGURE 1. The modification involves merely making the lapped outer surfaces, which are parallel to the junction, the polished reflectors. Base contact bar 12 is then replaced by a thin layer of conductive material which is partially reflecting and partially transparent at least at the wavelength of the coherent radiation. In like fashion, ohmic contact 8 may be enlarged to cover the entire outer surface of the p-type layer 7 and serve as a reflecting coating. However, since the diode thickness is very thin and the diode is fragile, one of the two ohmic contacts, 8 or 12, should be strong enough to support the diode. With this modification, the direction of propagation of coherent radiation is still perpendicular to the polished reflecting opposed surfaces, but it is now perpendicular to the plane of the junction between the n- and p-type layers, 6 and 7 respectively.

While the preceding disclosure has been directed primarily to a particular embodiment of a GaAs diffused diode for which specific operating data is supplied, it is to be understood that the invention is not to be limited by this example. Although a certain geometrical configuration is employed, it is obvious that the dimensions of the diode are not critical.

When the dimensions of the semiconductor wafer are changed, the current flow must be adjusted to provide at least the threshold value of current density required to establish an inverted population.

The requirement that the ends of the semiconductor material be ground parallel and polished to a high reflectivity in not essential in order to obtain maser operation. While the efficiency of the maser operation in unquestionably enhanced by parallel and polished surfaces, the important factor is to provide enough reflection and a volume of semi-conductor maser material large enough so that the photon density in a particular mode can build up to a large value.

In the foregoing illustration, population inversion results from current injection across the p-n junction of the gallium arsenide diode. The scope of the invention is not to be so limited since optical pumping as well as other techniques are well known for achieving population inversion. In such cases, the presence of a junction may be unnecessary. It should also be noted that when a junction is used for population inversion it need not be of p–n type but may be between layers of the same conductivity type differing in impurity atom concentration. This latter embodiment can also be explained by reference to FIGURE 1. Initially, the wafer 5 is a thin slab of germanium heavily doped with an acceptor impurity, such as zinc, to furnish a semiconductor material of p-type conductivity. Then a layer of compensated semiconductor material is formed on the surface of wafer 5. This is done, for example, by the indiffusion of a donor impurity element, such as arsenic, under appropriate conditions of time and temperature. After conventional treatment, the wafer 5 has a layer 6, heavily doped with zinc, which will be considered to be a "p+" layer and a thin layer 7 in which the effective charge of the acceptor impurity atoms has been changed by the concentration of indiffused donor impurity atoms to furnish a compensated layer which will be called a "p" layer. The barrier between the two layers 6 and 7 is called a planar p+–p junction. When a germanium diode of this p+–p junction type is forward biased, the states with inverted population are associated with the same band minimum, the first class mentioned earlier, and occur between acceptor atom and acceptor atom in the region of the junction. Since zinc acts as a double acceptor impurity element, this sort of transition can occur between zinc atoms having differing electron charges. In order to obtain a population inversion with reasonable pumping current, the operating temperature of the p+–p germanium diode is preferably at liquid helium temperatures, about 4° K. At this temperature the wavelength of the emitted radiation is found to be in the far infrared at approximately 20,000 A.

It is clear that the scope of the invention goes far beyond the limitations of the particular diodes used in the illustrative embodiments. The validity of the theoretical concepts is confirmed by the experimental data shown above and the choice of semiconductor material is directed to those materials in which a high efficiency of conversion of electrical energy to photons in a narrow frequency range makes maser action probable.

What is claimed is:

A solid state infrared maser comprising a planar p+–p junction diode of germanium doped with zinc, said diode having two opposed surfaces transverse to said junction ground parallel and polished to serve as reflectors, means to maintain said diode at a predetermined temperature, a source of current pulses connected to bias said diode for forward current flow, means to regulate the current flow through said diode at a current density across the area of said diode junction exceeding the threshold value required to achieve a population inversion between states of higher energy levels and states of lower energy levels in the region of said junction, said reflectors acting to define a resonator for at least one mode of a radiative transition whereby a narrow coherent monochromatic beam is emitted parallel to the plane of said junction.

References Cited by the Examiner

UNITED STATES PATENTS

| 3,059,117 | 10/1962 | Boyle et al. | 88—61 |
| 3,121,203 | 2/1964 | Heywang | 88—61 |

OTHER REFERENCES

Basov et al.: "Negative Absorption Coefficient at Indirect Transitions in Semiconductors," Advances in Quantum Electronics, J. Singer, ed., Columbia Univ. Press, New York, December 1961, pp. 496 to 506.

Benoit et al.: "Les Semi-Conductors et Leur Utilisation Possible dans les 'Lasers'," J. Physique et le Radium, vol. 22, No. 12, December 1961, pp. 834 to 836.

Bernard et al.: "Laser Conditions in Semi-Conductors," Physica Status Solidi, vol. 1, 1961, pp. 699 to 703.

Bernard et al.: "Possibilities de Lasers a Demi-Conductuers," J. Physique et le Radium, vol. 22, No. 12, December 1961, pp. 836 and 837.

Dumke: "Interband Transitions and Maser Action," Physical Review, vol. 127, No. 5, Sept. 1, 1962, pp. 1559 to 1563.

Hall: "Coherent Light Emission from GaAs Junctions," Physical Rev. Letters, vol. 9, No. 9, Nov. 1, 1962, pp. 366 to 368.

Keyes et al.: "Recombination Radiation Emitted by Gallium Arsenide," Proc. IRE, vol. 50, No. 8, August 1962, pp. 1822 and 1823.

Nasledov et al.: "Recombination Radiation of Gallium Arsenide," Soviet Physics Solid State, vol. 4, No. 4, October 1962, pp. 782 to 784 (translated from Fizika Tverdogo Tela., vol. 4, No. 4, April 1962, pp. 1062 to 1065; in Russian).

Nathan et al.: "Stimulated Emission of Radiation from GaAs p–n Junctions," Applied Physics Letters, vol. 1, No. 3, Nov. 1, 1962, pp. 62 to 64.

Quist et al.: "Semiconductor Maser of GaAs," Applied Physics Letters, vol. 1, No. 4, Dec. 1, 1962, pp. 91 and 92.

Weisberg et al.: "Materials Research on GaAs and InP," in Properties of Elemental and Compound Semiconductors, H. C. Gatos, ed., Interscience, New York, 1960, p. 49.

JEWELL H. PEDERSEN, *Primary Examiner.*

J. L. CHASKIN, R. L. WIBERT, *Assistant Examiners.*